UNITED STATES PATENT OFFICE 2,607,750

COPRECIPITATION OF THERMOPLASTIC RESINOUS MATERIALS WITH CATIONIC REACTION PRODUCT OF POLYFUNCTIONAL AMINO COMPOUNDS AND ALDEHYDES

Lucius H. Wilson, Greenwich, and Chester G. Landes, New Canaan, Conn., assignors to American Cyanamid Company, New York, N. Y., a corporation of Maine No Drawing. Application December 26, 1947, Serial No. 794,122

11 Claims. (Cl. 260—29.4)

This invention relates to the flocculation or co-precipitation of dispersions of thermoplastic resinous materials with cationic reaction products of polyfunctional amino compounds and aldehydes, and to the coagulants so obtained, and to casting molding processes and products involving the use of the coagulants.

A wide variety of water-insoluble resins can be satisfactorily prepared in the form of aqueous dispersions of relatively fine particle size. Representative dispersions of this type are polystyrene and polymethacrylate emulsions prepared by the emulsion polymerization of styrene and methylmethacrylate. Other emulsions are prepared by pouring molten resins into rapidly-agitating aqueous solutions of emulsifying agents. Similar emulsions are also prepared with the aid of organic water-insoluble solvents for the resinous or resin-forming materials.

It has now been found that, according to the teachings of this invention, aqueous dispersions of water insoluble thermoplastic resins of the type of polystyrene, polyacrylates, polymethacrylates, and the like, can be flocculated or coagulated by the admixture with colloidal cationic thermosetting resinous reaction products of a straight-chain polyfunctional amino compound and an aldehyde to produce flocculates or coagulates of novel or distinctive properties. Flocks or coagulates prepared by this method are obtained in the form of finely divided particles in which the two types of resin are present in intimate admixture, so that the molding properties of the thermoplastic resin are modified by the thermosetting cationic resin. This is of particular importance in obtaining thermoplastic molding powders of increased softening point and of improved hardness.

A wide variety of thermoplastic resins can be flocculated or coagulated from aqueous dispersions thereof, by the reaction of these cationic polyfunctional straight-chain amino compound aldehyde resins either in the form of dry solids or aqueous dispersions or solutions thereof. Polyvinyl compounds such as polystyrene, polymers of substituted styrenes, such as the mono- or dimethyl or chloro-styrenes, polyacrylates (e. g., polymers of methyl, ethyl, propyl, n-butyl, isobutyl, tertiary butyl, cyclohexyl and octyl acrylates), polymethacrylates (e. g., polymers of methyl, ethyl, propyl, n-butyl, isobutyl, tertiary butyl, cyclohexyl and octyl methacrylates), polyvinyl acetal, polyvinyl esters such as vinyl chloride polymers and vinyl acetate polymers or copolymers of vinyl acetate with vinyl chloride or copolymers of vinyl chloride and vinylidene chloride may be used. Similarly, copolymers of styrene with vinyl chloride or with acrylic acid esters or acrylonitrile and the like, may be prepared in the form of aqueous dispersions and coagulated or flocculated by the process of the present invention. Other thermoplastic resins which may be treated in this manner are the thermoplastic phenol-formaldehyde resins including phenol-acetaldehyde and phenol-furfural resins and the corresponding resins obtained from cresols and other alkyl phenols. Still other resins of this class are the coumarone resins, polyindene resins, vinyl acetylene resins, and the like. It is evident, therefore, that the process of the present invention is rather general in character, and can be applied to any thermoplastic resin capable of forming an aqueous dispersion of fine particle size.

Although dispersing or emulsifying agents of any suitable type may be employed in preparing aqueous dispersions of the above and similar thermoplastic resins, it is preferred to use the anionic or non-ionic dispersing agents, since a more rapid and complete flocculation is obtained when these dispersing agents are used. Typical anionic emulsifying agents are the soaps of aliphatic and cycloaliphatic acids such as potassium oleate and the like; amine soaps such as triethanolamine oleate and the like, sulphonated aliphatic compounds such as sodium lauryl sulfate and the sulfates of higher secondary alcohols; sulfonated products such as sodium keryl benzene sulfonate, sodium isopropyl naphthalene sulfonate, esters of sulfocarboxylic acids such as the esters of sodium sulfoacetate, dialkyl sulfosuccinates, di-sodium monoalkyl sulfosuccinamates, sulfonated lignin and the like.

Typical non-anionic emulsifying agents which may be used are polyethylene glycol-substituted maleic acid esters of the formula:

$$HO(CH_2O)_nCH_2O.CH.(COOR)CH_2.COOR$$

mannitan and sorbitan monoesters of higher fatty acids such as palmitic, stearic and oleic acids and their ethylene oxide condensation products and aryl-alkyl polyether alcohols.

The invention, in its broader aspects, is not limited by the methods used in preparing the aqueous thermoplastic resin dispersions, and any suitable method may be used. As is noted above, compounds capable of emulsion polymerization may be converted into aqueous dispersions of fine particle size by this method. Other compounds which are soluble or dispersible in organic solvents such as, for example, coumarone and polyindene resins may be emulsified as resins in these solvents. The following procedure in which the proportions are in parts by weight for the emulsion polymerization of styrene, is one example of many which may be employed.

A solution containing 1.2 parts of a higher alkyl sulfate (molecular weight 350) in 58.8 parts of water is prepared and heated to 94° C., and 0.05 part of 40% hydrogen peroxide added. Forty parts of styrene are then introduced uniformly over a period of about 1.5 hours. The exothermic polymerization reaction proceeds smoothly and is complete after about 3.5 hours. Steam is then blown through the batch to remove any unpolymerized material, and the concentration of solids in dispersion is adjusted to about 25% solids. An aqueous dispersion of polystyrene of relatively high molecular weight having an average particle size of 0.01 to 0.075 micron is obtained. Other compounds suitable in practicing this invention form emulsions having an average particle size of 0.01 to 25 microns.

A substantially complete coagulation or flocculation of the dispersed thermoplastic resins is obtained when about 2 to about 20% of their weight of cationic resin is applied, the exact amount depending on the particle size of the dispersed thermoplastic resin, the pH of the solution, and the particular cationic resin employed. When the pH of the suspension is on the acidic side, that is about 4.0, a lesser amount of any particular cationic resin is required than is obtained at higher pHs. In fact, the amount of cationic resin required varies directly with the pH and somewhat indirectly with the particle size. It should be understood, however, that much larger quantities of the cationic resin than the minimum amount required may be used if desired, as these larger quantities such as 100% or more, based on the weight of the thermoplastic resins are flocculated or co-precipitated by the process of this invention. The amounts of cationic resins employed are not, therefore, restricted to those which will bring about flocculation of the thermoplastic resin but also include larger amounts that may be desirable to modify the characteristics of the resultant molded product.

After mixing the cationic resin or a solution or dispersion thereof with the thermoplastic resin dispersion, and agitating to complete flocculation, the resinous mixture may be recovered by any suitable procedure. With any of the thermoplastic resins such as polystyrene, polyindene, and the like, the resinous product is obtained as a powder, simply by filtering and drying the filter cake. Other resins such as polymerized methylmethacrylate may require evaporation under a partial vacuum under temperatures below the softening point of the resin. The cationic resins suitable as flocculating agents according to the practice of this invention are selected from the group consisting of the reaction products of an aldehyde with a straight-chain polyfunctional amino compound.

As specific examples of the cationic resins there may be mentioned the urea-formaldehyde resins modified with a cationic substance such as the polyamines including ethylenediamine, diethylenetriamine, tetraethylenepentamine, guanidine, phenylbiguanide, bisguanidine, and the salts thereof, and the condensation reaction product of tetraethylenepentamine and epichlorohydrin; the urea-formaldehyde resins modified with hydroxylamines such as the monoethanolamine, diethanolamine, and the urea-formaldehyde resins modified with cyanoamine and the derivatives thereof such as dicyandiamide, polyphenylbiguanide, polyphenyl methyl biguanide, and the urea-formaldehyde resins modified with an amino-amide such as guanylurea and dicarbamyl guanidine and the urea-formaldehyde resins modified with quaternary ammonium salts such as tetraethanol ammonium chloride, and methylated dimethyl aniline quaternary ammonium salts; and, the reaction product of these resin modifying agents with formaldehyde in the absence of urea such as tetraethylenepentamine-formaldehyde, guanidine-formaldehyde, phenolbiguanidine-formaldehyde, bisbiguanidine-formaldehyde, polyphenolbiguanide-formaldehyde, guanylurea-formaldehyde, and the like.

The invention is further illustrated by the following specific examples in which the proportions are in parts by weight to which, however, the examples and the invention is not limited.

Example 1

To 400 parts of a polystyrene resin emulsion containing 25% solids, there were slowly added, while stirring, 20 parts of a dry solid cationic tetraethylenepentamine - urea - formaldehyde resin containing approximately 25 mols of formaldehyde, one mol of urea, and 0.70 mol of tetraethylenepentamine. The two resins separated out of the dispersion as an intimately mixed, finely subdivided precipitate which was filtered, washed, and dried in warm air. This dried precipitate was molded at 300° F., and 5000 p. s. i. to produce translucent molded articles.

Example 2

To 400 parts of an aqueous polystyrene emulsion containing 25% solids, there was added, with agitation, 200 parts of an aqueous solution containing 20 parts of tetraethylenepentamine-urea-formaldehyde resin. The two resins were immediately precipitated in an intimately mixed, finely subdivided state. The precipitate was then filtered, washed, and dried in an oven of circulating air at 150° F. The dried product obtained in this manner was molded at 300° F. and 5000 p. s. i. to produce translucent molded articles.

The above examples illustrate the flocculating action of the cationic resins, either in solid form or as dispersions or solutions thereof. These experiments were repeated using other proportions of the cationic agent such as 0.03 mol to about 0.8 mol of tetraethylenepentamine reacted with 2½ mols of formaldehyde, and 1 mol of urea. Other experiments were performed by using various proportions of other cationic resins such as the urea-formaldehyde resins modified with various quantities of ethylene diamine, diethylene triamine, tetraethylenepentamine, guanidine, phenyl-biguanide, bisguanidine, and the salts thereof, and the condensation reaction product of tetraethylenepentamine and epichlorohydrin; monoethanolamine, diethanolamine, dicyandiamide, polyphenylbiguanide, polyphenyl methyl biguanide, guanylurea and dicarbamyl guanidine, tetraethanol ammonium chloride, methylated dimethyl aniline quaternary ammonium salts; and, the reaction product of these resin modifying agents with formaldehyde, in the absence of urea, such as tetraethylenepentamine-formaldehyde, guandine-formaldehyde, phenolbiguanidine-formaldehyde, bisbiguanidine-formaldehyde, polyphenolbiguanide-formaldehyde, guanylurea-formaldehyde, and the like.

The co-precipitated or flocculated resins produced in accordance with the present invention may be used for shaped articles in molding and other analogous products. They may also be employed as adhesives to join together the same or diverse substances including paper, cloth, metal, wood, glass, and the like.

The resins prepared in accordance with this invention may be used alone or admixed with other resins, fillers, dyes, pigments, diluents, and the like.

We claim:

1. A process which comprises mixing tetraethylenepentamine-urea-formaldehyde resin with an aqueous dispersion of a synthetic water-insoluble non-cationic thermoplastic resin, whereby said dispersion is flocculated and said tetraethylenepentamine resin is co-precipitated therewith.

2. A process which comprises mixing a polyethylenepolyamine-urea-formaldehyde resin with an aqueous dispersion of a synthetic water-insoluble non-cationic thermoplastic resin, whereby said dispersion is flocculated and said polyethylenepolyamine-urea-formaldehyde resin is co-precipitated therewith.

3. A process which comprises mixing a guanide-urea-formaldehyde resin with an aqueous dispersion of a synthetic water-insoluble non-cationic thermoplastic resin, whereby said dispersion is flocculated and said guanide urea-formaldehyde resin is co-precipitated therewith.

4. A process which comprises mixing a polyphenyl biguanide-formaldehyde resin with an aqueous dispersion of a synthetic water-insoluble non-cationic thermoplastic resin, whereby said dispersion is flocculated and said polyphenyl biguanide-formaldehyde resin is co-precipitated therewith.

5. A resinous product formed by the process of claim 1.

6. A process which comprises mixing an aqueous dispersion of synthetic water insoluble non-cationic thermoplastic resin and a straight-chain cationic resin whereby said dispersion is flocculated and the cationic resin coprecipitated therewith, wherein said cationic resin is selected from the group consisting of (1) resins prepared by reacting (a) urea, (b) formaldehyde and (c) a compound selected from the group consisting of polyamines, hydroxyl amines, cyano-amines, amino-amides and quarternary ammonium salts and (2) resins prepared by reacting (a) formaldehyde and (b) a compound selected from the group consisting of polyamines, hydroxylamines, cyanoamines and amino-amides.

7. A process which comprises mixing a cationic resin and an aqueous dispersion of polystyrene whereby said polystyrene is flocculated and the cationic resin coprecipitated therewith, wherein said cationic resin is selected from the group consisting of (1) resins prepared by reacting (a) urea, (b) formaldehyde and (c) a compound selected from the group consisting of polyamines, hydroxylamines, cyano-amines, amino-amides and quarternary ammonium salts and (2) resins prepared by reacting (a) formaldehyde and (b) a compound selected from the group consisting of polyamines, hydroxylamines, cyano-amines and amino-amides.

8. A process which comprises mixing a straight-chain cationic resin with an aqueous dispersion of a synthetic water insoluble non-cationic thermoplastic resin, said dispersion being formed by means of an anionic dispersing agent, whereby said dispersion is flocculated and said cationic resin coprecipitated therewith, wherein said cationic resin is selected from the group consisting of (1) resins prepared by reacting (a) urea, (b) formaldehyde and (c) a compound selected from the group consisting of polyamines, hydroxylamines, cyano-amines, amino-amides and quarternary ammonium salts and (2) resins prepared by reacting (a) formaldehyde and (b) a compound selected from the group consisting of polyamines, hydroxylamines, cyano-amines and amino-amides.

9. A resinous product formed by the process of claim 6.

10. A resinous product prepared by coprecipitating polystyrene from an aqueous dispersion thereof by mixing with said dispersion a straight-chain cationic resin wherein said cationic resin is selected from the group consisting of (1) resins prepared by reacting (a) urea, (b) formaldehyde and (c) a compound selected from the group consisting of polyamines, hydroxylamines, cyano-amines, amino-amides and quarternary ammonium salts and (2) resins prepared by reacting (a) formaldehyde and (b) a compound selected from the group consisting of polyamines, hydroxylamines, cyano-amines and amino-amides.

11. A molded article comprising the coprecipitate of polystyrene and a straight chain cationic resin, wherein said cationic resin is selected from the group consisting of (1) resins prepared by reacting (a) urea, (b) formaldehyde and (c) a compound selected from the group consisting of polyamines, hydroxylamines, cyano-amines, amino-amides and quarternary ammonium salts and (2) resins prepared by reacting (a) formaldehyde and (b) a compound selected from the group consisting of polyamines, hydroxylamines, cyano-amines and amino-amides.

LUCIUS H. WILSON.
CHESTER G. LANDES.

REFERENCES CITED

The following references are of record in the file of this patent:

UNITED STATES PATENTS

| Number | Name | Date |
|---|---|---|
| 2,334,545 | D'Alelio | Nov. 16, 1943 |